United States Patent
Andriunas et al.

(10) Patent No.: US 6,862,757 B2
(45) Date of Patent: Mar. 8, 2005

(54) INFANT AND PET CO-SLEEPER APPARATUS

(76) Inventors: Larry Andriunas, 7219 S. Marshall St., Littleton, CO (US) 80123; Hildegard Andriunas, 7219 S. Marshall St., Littleton, CO (US) 80123

(*) Notice: Subject to any disclaimer, the term of this patent is extended or adjusted under 35 U.S.C. 154(b) by 0 days.

(21) Appl. No.: 10/226,391

(22) Filed: Aug. 23, 2002

(65) Prior Publication Data

US 2003/0037372 A1 Feb. 27, 2003

Related U.S. Application Data

(60) Provisional application No. 60/314,468, filed on Aug. 23, 2001.

(51) Int. Cl.$^7$ ................................................. A47D 7/04
(52) U.S. Cl. ................................................. 5/95; 5/93.2
(58) Field of Search ............................ 5/95, 96, 671, 5/655, 507.1, 93.1, 93.2

(56) References Cited

U.S. PATENT DOCUMENTS

| | | | | |
|---|---|---|---|---|
| 328,157 A | * | 10/1885 | Tyler | 5/95 |
| 472,647 A | * | 4/1892 | Walker | 5/95 |
| 874,421 A | * | 12/1907 | Nail | 5/95 |
| 961,669 A | * | 6/1910 | Atkinson | 5/95 |
| 5,148,561 A | | 9/1992 | Tharalson et al. | 5/95 |
| 5,161,484 A | | 11/1992 | Duane | 119/28.5 |
| 5,172,435 A | * | 12/1992 | Griffin et al. | 5/95 |
| 5,293,655 A | | 3/1994 | Van Winkle et al. | 5/95 |
| 5,430,899 A | * | 7/1995 | Chisholm | 5/95 |
| 5,819,340 A | | 10/1998 | Kelly | 5/95 |
| 5,845,349 A | * | 12/1998 | Tharalson et al. | 5/99.1 |
| 6,112,347 A | | 9/2000 | Tharalson et al. | 5/95 |
| 6,148,456 A | * | 11/2000 | Tharalson et al. | 5/99.1 |
| 6,202,228 B1 | * | 3/2001 | Cox | 5/95 |
| 6,550,082 B2 | * | 4/2003 | Tharalson et al. | 5/95 |

* cited by examiner

*Primary Examiner*—Frederick L. Lagman
(74) *Attorney, Agent, or Firm*—Sheridan Ross P.C.

(57) ABSTRACT

A co-sleeping apparatus which facilitates parents sleeping with infants and/or pets is devoid of ground contacting support members, thus eliminating obstacles to vacuuming, allowing for simpler construction, portability and transport, etc. Various embodiments of the present co-sleeper provide for one or more of the following: adjustable height sidewalls; adjustable angulation of mattress platform; suspended mattress platform in the absence of rigid vertical supports between a top supporting rail and a mattress platform; provision of pockets/hampers along the exterior and/or beneath the co-sleeping apparatus for storage of products; a retractable cover; provision of mechanical bouncing, heating, rocking and sound emitting apparatuses in association with the co-sleeper, etc. In a particular embodiment, the design relates to a co-sleeper for pets, the confines of such co-sleeper permits access of pets to food, water, kitty litter, etc.

16 Claims, 11 Drawing Sheets

INFANT AND PET CO-SLEEPER APPARATUS

RELATED APPLICATIONS

This application claims priority from U.S. Provisional Patent Application No. 60/314,468 filed in Aug. 23, 2001. The entire disclosure of the provisional application is considered to be part of the disclosure of the accompanying application and is hereby incorporated by reference.

FIELD OF THE INVENTION

The present invention is directed to a co-sleeping apparatus permitting an adult to sleep in his/her own bed and facilitating the attachment of an apparatus for comfortably and safely holding an infant or a pet so that the infant and/or pet is in close proximity to the adult.

BACKGROUND OF THE INVENTION

Recently there has been a renewed debate with respect to the advantages and risks associated with parents sleeping in the same bed with their new born infants. The obvious risks involved in parent cohabitation with an infant involve the prospect that the infant may be innocently and unintentionally rolled on top of and/or smothered by the parents when the parents move during their sleep. The obvious advantages of having an infant co-habit the parental bed include, for example, the ease by which such infant can be breast fed by the mother and the advantages associated with the parent being able to hear, touch and feel their child, and thus assure the parent of the child's well being. Although a common practice in the United States and Europe is to have infants and small children placed in their own crib or bed very soon after they are born, thus permitting the parents to resume their sleeping habits developed prior to having a child, many other cultures view such a practice as cold hearted and against the natural parental tendencies. Indeed, some African cultures view the placement of a young child in a crib as tantamount to placing the child in a cage, promoting unnecessary crying behavior when the child realizes that it is entrapped and encouraging the child to garner parental attention by crying, screaming, etc., which unduly upsets the child. Recently, experts in the childrearing and development field have touted the advantages of sleeping with infants and small children to provide them with a more secure feeling and fostering a better parental-child relationship. Unfortunately, due to the ever present dangers involved in parents' unintentionally rolling over onto a child and injuring the child and/or causing suffocation, there exists a need for a relatively simple, inexpensive device that can facilitate co-sleeping of a parent and an infant/child without the prior dangers experienced in simply having an infant co-habit the parental bed.

The common desire of pets to sleep in the bed of their owners also creates various and obvious problems. Typical remedies include only allowing the pet to sleep at the side or front of the bed, or simply permitting the pet to co-occupy some portion of a bed normally reserved for just humans. The undesired accumulation of pet hair, dirt, oils, etc. that may soil beddings is an unfortunately result of such a practice. There is therefore a need for a device that permits companion animals to sleep in close proximity with their owners without relegating such animals to a place on the bedside floor, or compelling pet owners to tolerate the filth encountered with pets sharing their bed.

Various co-sleeper beds have been disclosed in the prior art. For example, U.S. Pat. No. 6,112,347 to Tharalson et al. discloses a bed-side crib that attaches to a parental bed and is convertible for use as a child's easel, couch, bassinet or toy display/storage device. Tharalson et al. requires, however, the use of supporting legs which transcend from the co-sleeper bed to the floor, thus causing problems with respect to availability of floor space, vacuuming capabilities and simple undesired physical obstacles in the parental bedroom. Moreover Tharalson et al.'s design incorporates various structural supports and features that not only add to the cost, rigidity and weight of such device, such features may also pose certain risks to infants (e.g., contact with hard, unforgiving surfaces, etc.). U.S. Pat. No. 5,148,561 to Tharalson et al., shows another version of a baby crib adjacent to a parental bed, also showing the use of adjustable legs to support the crib above the floor and next to the parental bed. Similarly, U.S. Pat. No. 5,293,655 to Van Winkle, et al., is directed to a nursing cradle which also has legs projecting to the ground so as to support the nursing cradle above the ground and beside the parental bed. U.S. Pat. No. 5,819,340 to Kelly discloses a crib for newborns that is placed in close proximity to a parent's bed without being physically attached thereto, such infant bassinet supported by ground extending members and having similar deficits as described above (e.g., hard support surfaces, etc.).

Moreover, several prior art patents disclose various types of pet beds (e.g., U.S. Pat. No. 5,161,484). Such devices also require support from legs extending to the ground, heavy, hard structured features, etc., thus suffering from many of the same limitations as discussed above with respect to infant/child co-sleepers.

There is a need for a relatively inexpensive, co-sleeper for infants and/or pets which can easily be connected to an individual's bed without the use of ground contacting legs (which take up valuable floor space and create undesired obstacles with respect to access under the bed, hinder vacuuming operations, etc.) and that is devoid of hard structural features that may potentially injure a child/pet, or that makes it difficult to collapse such device for easy transport.

SUMMARY OF THE INVENTION

The present invention is directed to a co-sleeping apparatus that does not contact the ground underneath such apparatus, but rather, is operatively associated with a parental bed to facilitate co-sleeping of an infant or pet along side a parental bed. In one embodiment, an attachment member fits between a parental mattress and a parental box spring thus attaching the co-sleeping apparatus to the parental bed. A substantially vertical orientation of a rigid member associated with the co-sleeping apparatus can be used to orient the co-sleeping apparatus properly with respect to the parental bed. A support railing of the co-sleeper apparatus defines the uppermost portion of the co-sleeper. Beneath such support railing is a mattress platform for supporting a child/infant/pet mattress. In a preferred embodiment, the mattress platform is suspended beneath the support railing by flexible material. In a further preferred embodiment, few, if any, vertical support rails are positioned around the periphery of the co-sleeping apparatus. Indeed, in one embodiment, partially see-through material is connected to the support rail and the mattress platform merely is suspended by such see-through or partially see-through material. This provides ready viewing of the interior of the co-sleeping apparatus by parents/pet owners.

Another embodiment of the present invention relates to a movable partition that separates the area circumscribed by the co-sleeping apparatus as opposed to the parental bed. The partition prevents unintended contact between infant/pet with an individual in the parental bed. The co-sleeper apparatus of the present invention is preferably collapsible to facilitate ease of transport and/or storage. In still other embodiments, the mattress platform may comprise one or more compartments for the storage or containment of pet food, water, kitty litter, various baby related items, etc. Furthermore, storage compartments can be provided on the sides of and/or underneath the co-sleeping apparatus. In one particular embodiment, one support leg is provided beneath the co-sleeping apparatus to ensure proper support, for example, a large pet. Yet further embodiments include covers extending over the top of the co-sleeping apparatus, telescopically/adjustable side members to adjust the height of the sides of the co-sleeping apparatus. Other aspects and embodiments of the present invention will occur to those of skill in the art from the attached drawings and the detailed description as provided hereinbelow.

DETAILED DESCRIPTION

Figure 1:
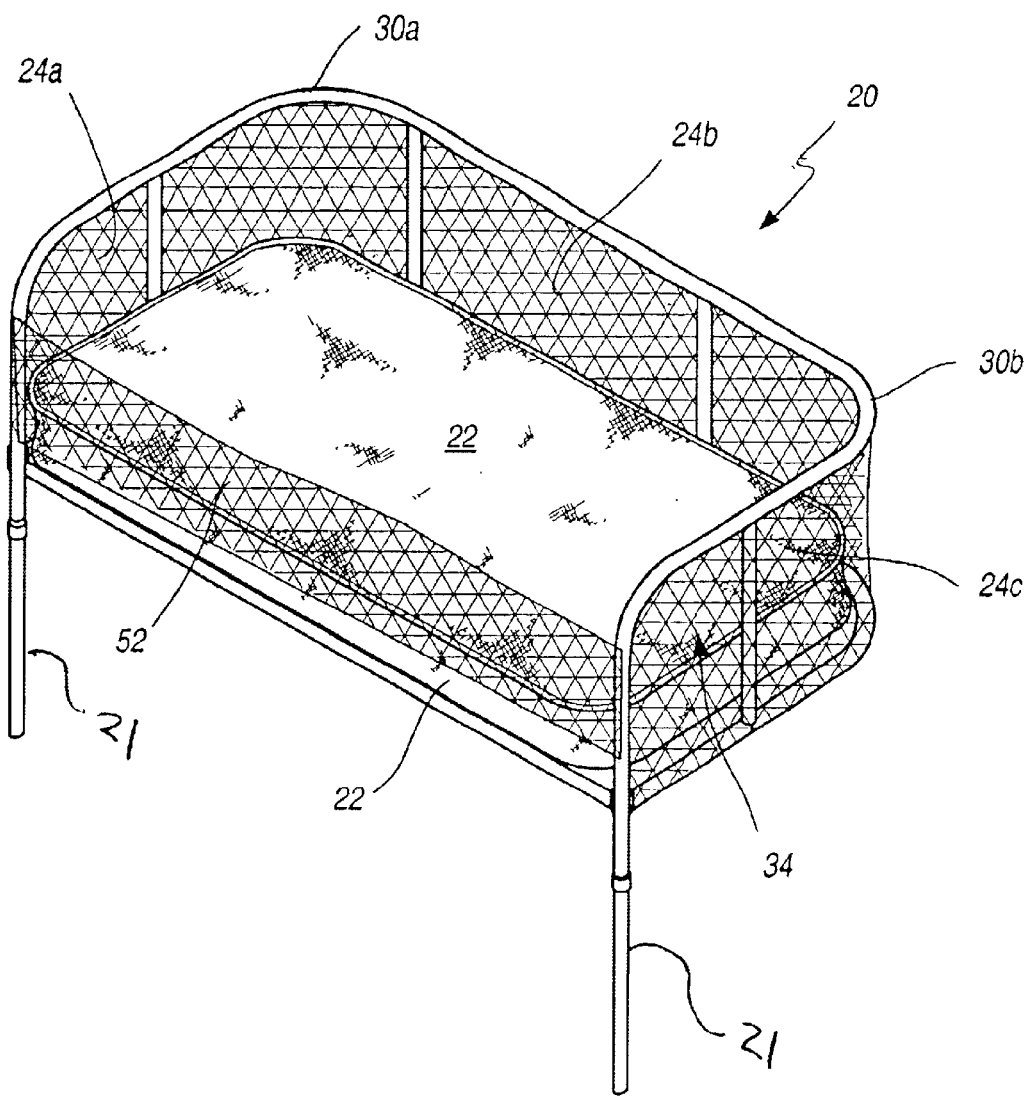
FIG. 1 is a top perspective view of one embodiment of the present invention in which a fold down panel, see-through netting, etc. are utilized.
Figure 2:
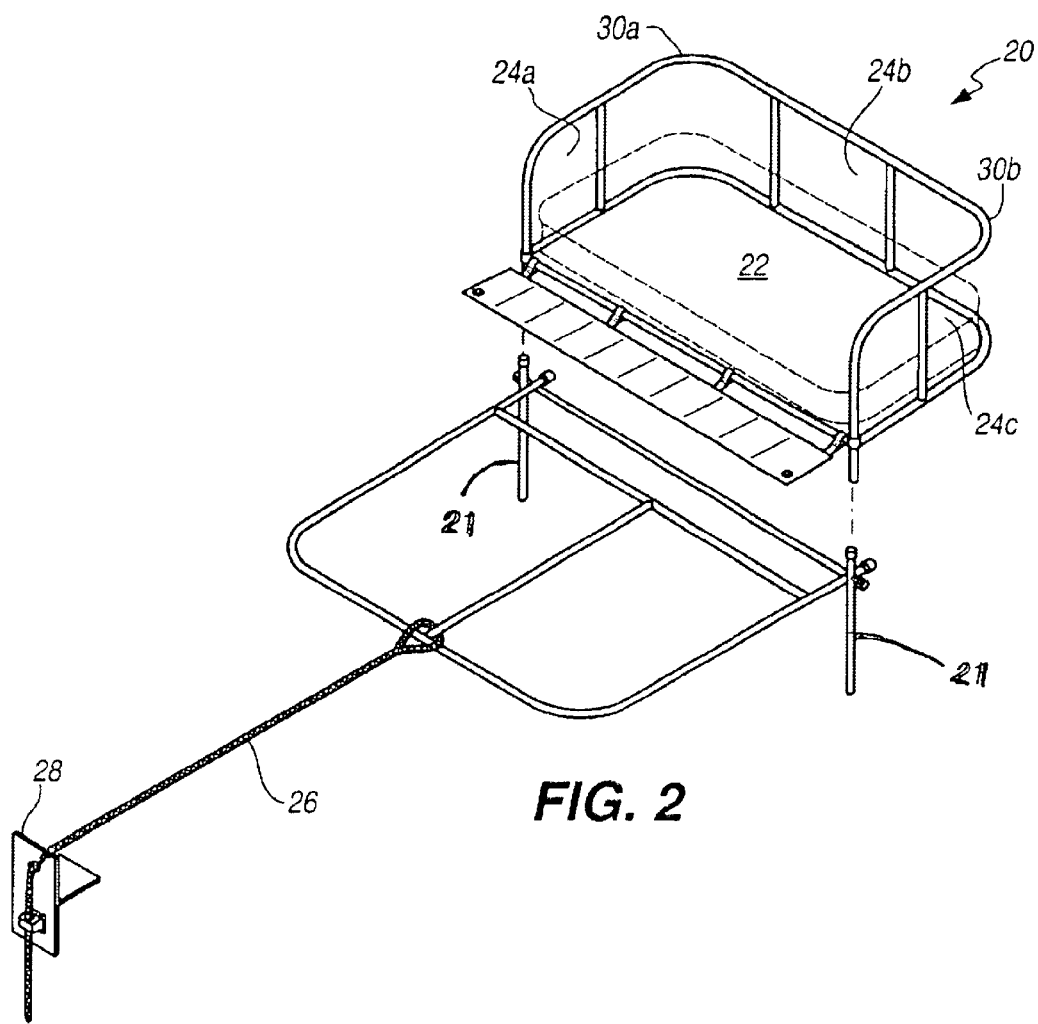
FIG. 2 is a top perspective view of one embodiment of the present invention showing a connecting strap and/or rope that fits between a box spring and a mattress to securely hold the co-sleeper apparatus in a side-bed relationship.
Figure 3:
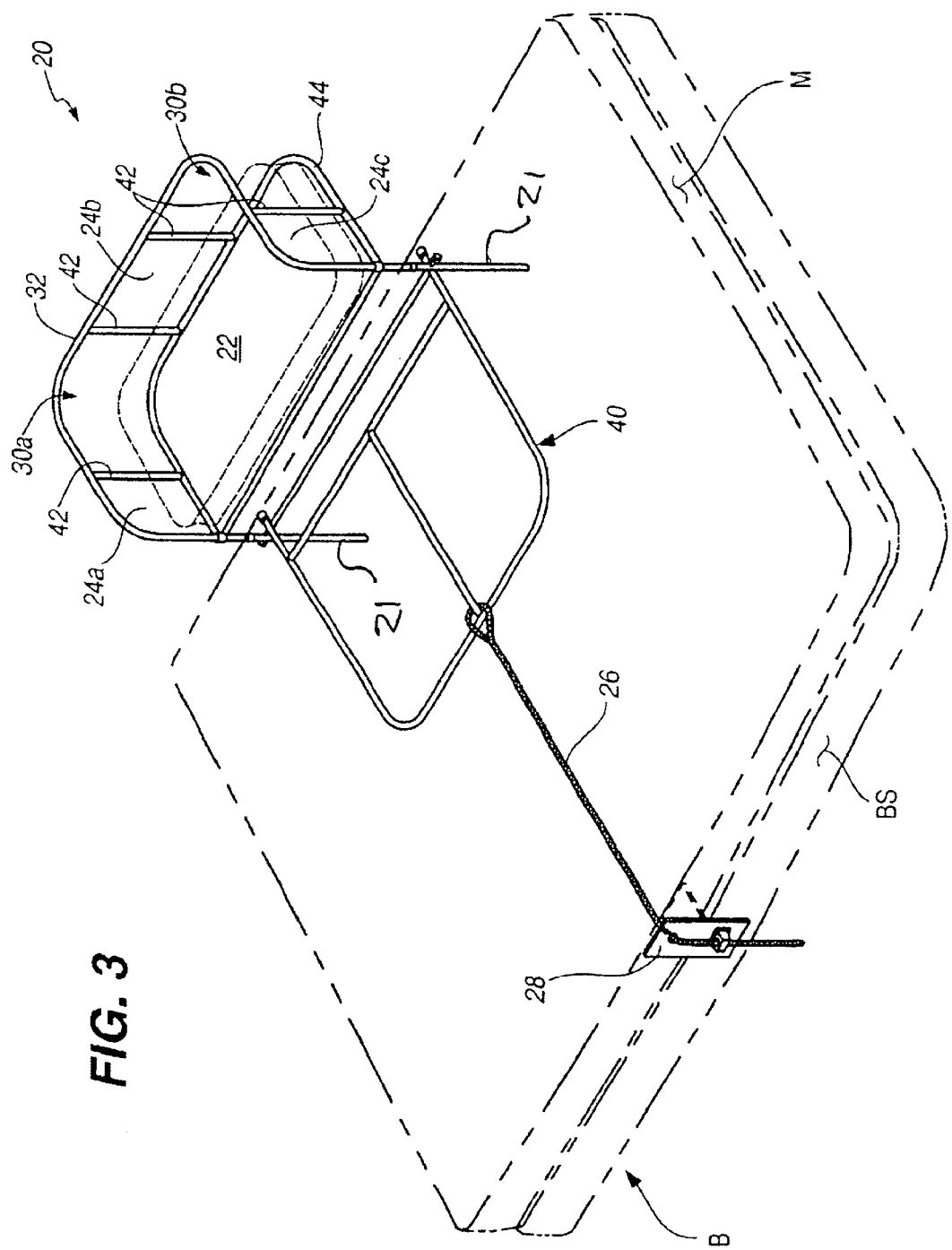
FIG. 3 illustrates a further embodiment of the present invention with the parental bed relationship illustrated.

With reference to FIGS. 1–3, a co-sleeping apparatus 20 is disclosed having a mattress 22, and three opposing vertically extending sidewalls or side panels 24a,b, and c. The co-sleeper apparatus 20 is operatively attached to an individual adult bed B by various means discussed below (e.g., a connecting appendage 40, strap or rope 26) which extends preferably between the parental mattress M and box spring BS-. The appendage 40 is preferably constructed of the same material as the structural supports of the co-sleeper 20 itself and serves the purpose of securing the co-sleeper 20 to the parental bed B by friction/weight provided between the mattress M and box spring BS.

In one embodiment, a rope or strap 26 is also connected on one end to the co-sleeping apparatus 20 and to the other end to a brace 28, which vertically extends so that it cannot fit between the parental mattress M and box spring BS, thus holding the rope or strap 26 under tension and facilitating the free standing nature of the co-sleeping apparatus 20 without the use of any support legs. Such strap/rope 26 also serves to maintain the co-sleeper 20 in position in the event torsional forces are experienced (e.g., the co-sleeper 20 is hit in a way that may cause it to rotate horizontally, thus creating undesired gaps between the co-sleeper 20 and the parental bed B). Note, that the vertical descending rigid members 21 (FIGS. 1–3) stabilize and secure the appendage 40 against the parental mattress M and box spring BS when, e.g., the strap or rope 26 is tensioned between the appendage 40 and the brace 28. As one will appreciate, without the use of any ground contacting support legs, the present invention is simpler, easier and more cost effective to construct than prior art devices. Moreover, without support legs, it is possible to place items underneath the present co-sleeping bed, including dressers, trunks, bassinets, storage devices, etc., that would not otherwise be possible if ground supporting legs were attached thereto.

Other unique aspects of one embodiment of the present invention include the absence of any right-angled corners between the connecting side panels 24a, b, c. Thus, in a preferred embodiment, the corners 30a, b of the co-sleeping apparatus 20 are curved and/or rounded such that no sharp edges are exposed either on the interior or exterior of the co-sleeper 20, further addressing safety concerns. Moreover, the side panels 24a, b, c themselves are preferably made of non-rigid material, more preferably comprised of either a transparent and/or semi-transparent material. For example, a fish net material can be utilized so that one can view a sleeping infant and/or pet by looking through the side panels 24a, b, c. Prior art devices teach sides having either a spoked configuration and having solid vertical supports (see, e.g., U.S. Pat. No. 5,293,655 to Van Winkle et al.; U.S. Pat. No. 6,112,347 to Tharalson et al., etc.) or solid support walls (see, e.g., U.S. Pat. No. 5,148,561 to Tharalson et al.). In a preferred embodiment of the present invention, a top supporting rail 32 is provided from which material 34, preferably such as fish net material or other at least semitransparent and/or breathable material (e.g., which allows air flow there through), descends from such support rod structure 32. Although various connecting structures (e.g., either vertical or angled in nature) can be used to connect the top support rail 32 to the mattress support 44, it is not necessary in various embodiments of the present invention which rely merely upon the tensile and connecting strength of the flexible material 34 to connect the mattress support 44 to the above-supporting rod 32 (e.g., in a hanging configuration).

Referring to FIGS. 2 and 3, in one embodiment, a safety strap 26 is provided that connects the co-sleeper 20 to the opposite side of the parental bed B. A locking anchor 28 is associated with one end of the safety strap 26 opposite to the side of the bed where the co-sleeper 20 is positioned.

Figure 4:
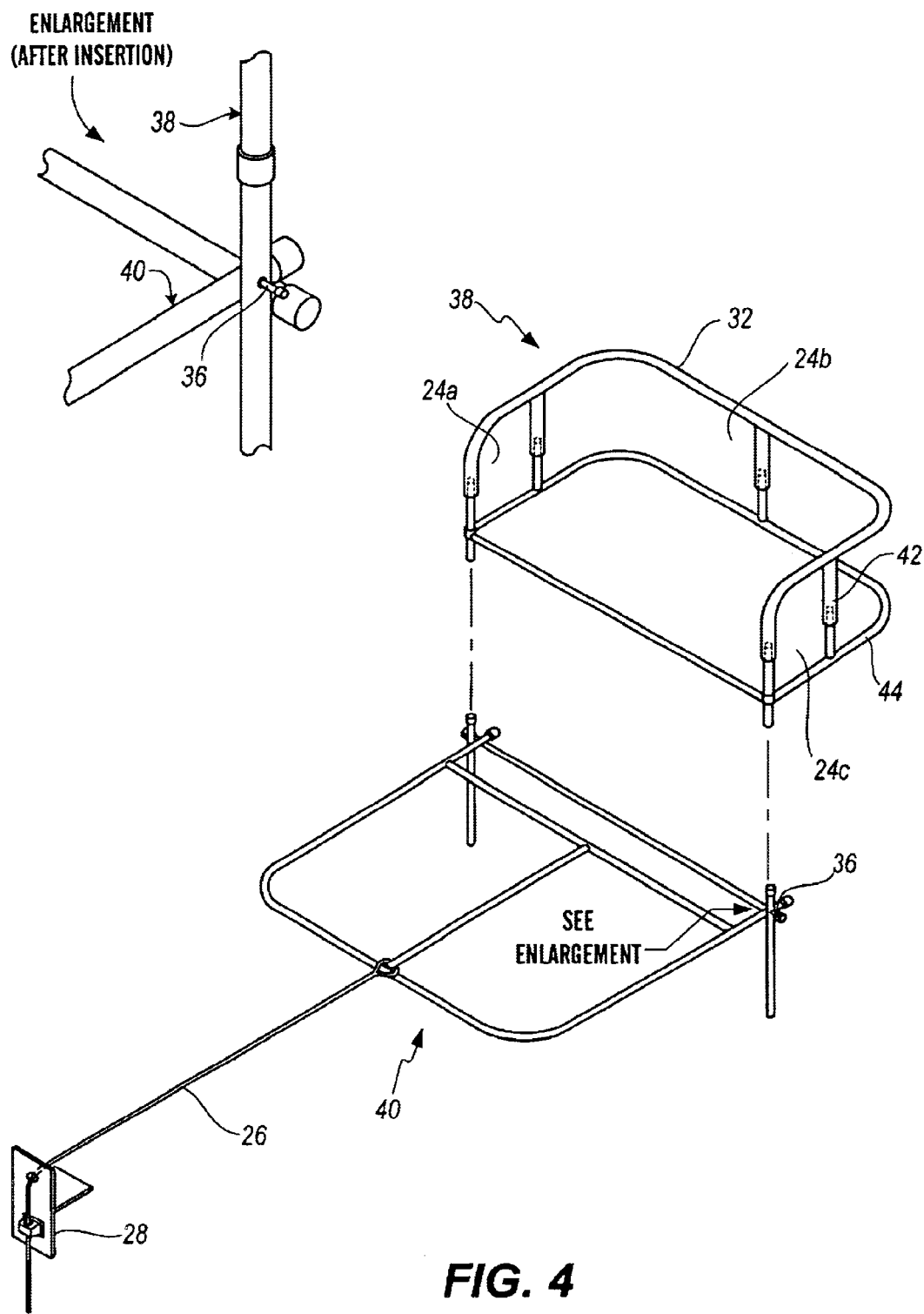
FIG. 4 is an exploded perspective view of an embodiment of the present invention showing how the co-sleeper is connectable to the parental bed, in particular, spring-loaded lock mechanisms/release pins, for easy reversible connection and disconnection of the co-sleeper to an adult bed support.

As shown in FIG. 4, one embodiment of the present invention relates to the connectability of the co-sleeper 20 to the parental bed B. Although any suitable means can be used to reversibly associate the co-sleeper bed 20 to the parental bed B, in one particular embodiment, a spring-loaded lock and release pin 36 is utilized in order to afford relatively easy reversible connection and disconnection of the co-sleeper frame 38 to the adult bed support 40. In a preferred embodiment, a spring-loaded lock and release pin 36 is utilized to reversibly connect and disconnect the co-sleeper frame 38 from the adult bed support 40. For example, by pulling against a spring biased pin 36, the co-sleeper frame 38 can be disassociated from the adult bed support 40, and by aligning apertures in the adult bed support 40 with the locking pin 36, the pin 36 can be sprung into locking engagement therewith, thus securing the co-sleeper bed frame 38 to the adult bed support 40 in a suitable fashion. Other securement means between the adult bed support 40 and the co-sleeper frame 38 can obviously be utilized and more than two connection points between the adult bed support 40 and the co-sleeper frame 38 are clearly within the scope of the present invention.

As may be appreciated by one of skill in the art, various vertical supporting structures 42 can be used to connect the co-sleeper mattress support 44 to the upper support bar/railing 32 forming the upper region of the sidewalls 24a,b,c surrounding the co-sleeper bed 20. Each of such vertical supports 42 can be provided in a telescoping and/or other similar arrangement whereby the height of the sidewall 24a,b,c of the co-sleeper 20 can be adjusted in a desired fashion and thereafter locked into the desired height configuration.

One advantage of one embodiment of the present invention is that it does not utilize integral, rigid vertical supports between the co-sleeper mattress support 44 and the top supporting rail 32, thus permitting the collapsability of the present device, making storage and/or transport of the co-sleeping apparatus 20 far easier. For example, the co-sleeper mattress support 44 can be essentially collapsed to be co-planar with the top support rail 32 making it essentially flat. The parental mattress support rods 42 (running vertically when supporting the co-sleeper apparatus), can be either telescopically disassembled and/or simply pivotally attached to the support rail 32 such that the entire unit can be collapsed/folded into an essentially flat configuration. As one will further appreciate, any of the telescoping members mentioned herein can be connected by an elastomeric member, thus making the attachment and detachment of such members relatively easy without concerns with respect to loosening corresponding telescoping members, and/or encountering difficulties in constructing of such a unit.

Figure 5:
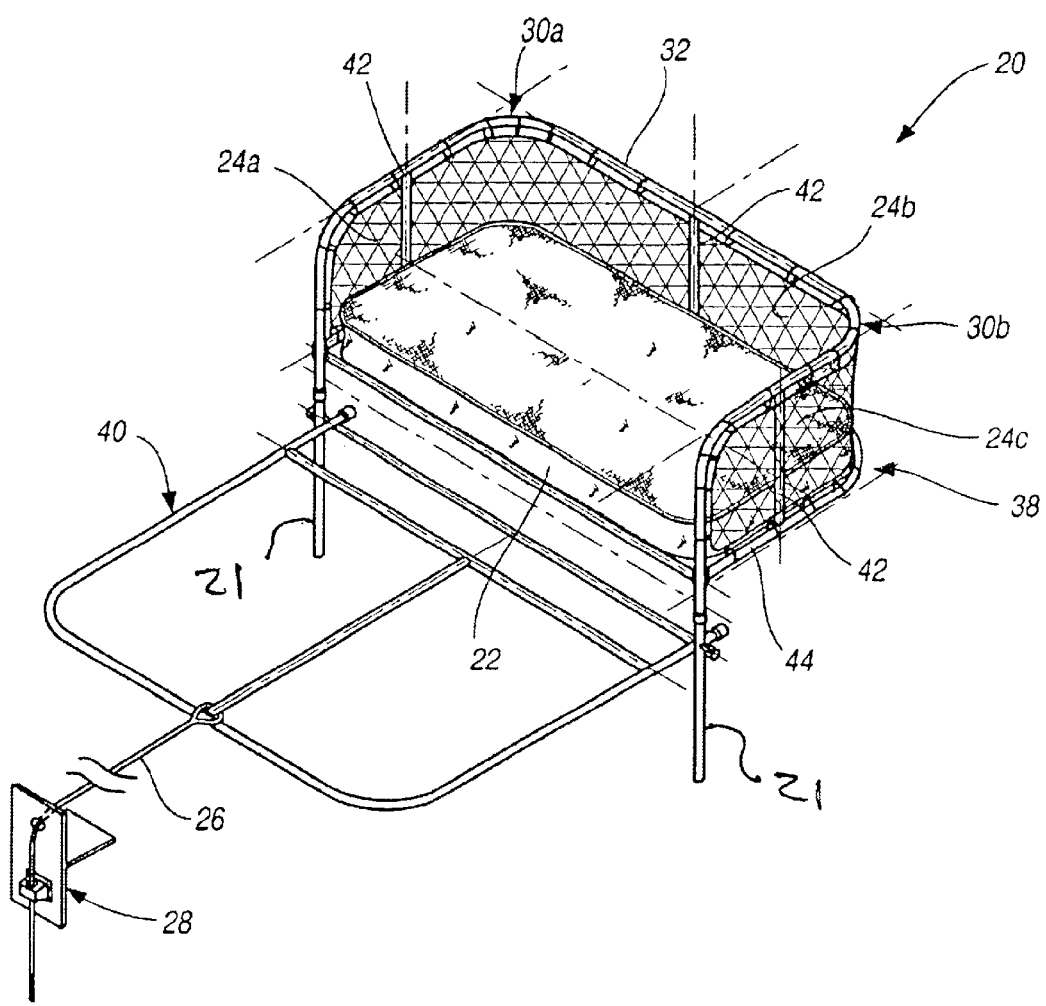
FIG. 5 is a perspective view of one embodiment of the present invention showing a mattress strap connected to an elongated, substantially rigid, between-the-mattress support which properly supports the co-sleeper apparatus.

Referring now to FIG. 5, in one aspect of the present invention, the adult bed support 40 is an elongated, substantially rigid, between-the-mattress support that may be used to support the co-sleeper apparatus 20. The adult bed support 40 is preferably constructed of rigid flat or tubular members, and may include surface texturing or laterally extensive attachments (not shown) that assist in developing stabilizing frictional forces. Accordingly, the elongated, substantially rigid, between-the-mattress support 40 maybe sized to take advantage of the weight and friction stabilizing forces developed by placing the adult mattress M over the elongated, substantially rigid, between-the-mattress support 40. In addition, the elongated, substantially rigid, between-the-mattress support 40 may be used in conjunction with a safety strap 26, as also depicted in FIG. 5.

Figure 6:
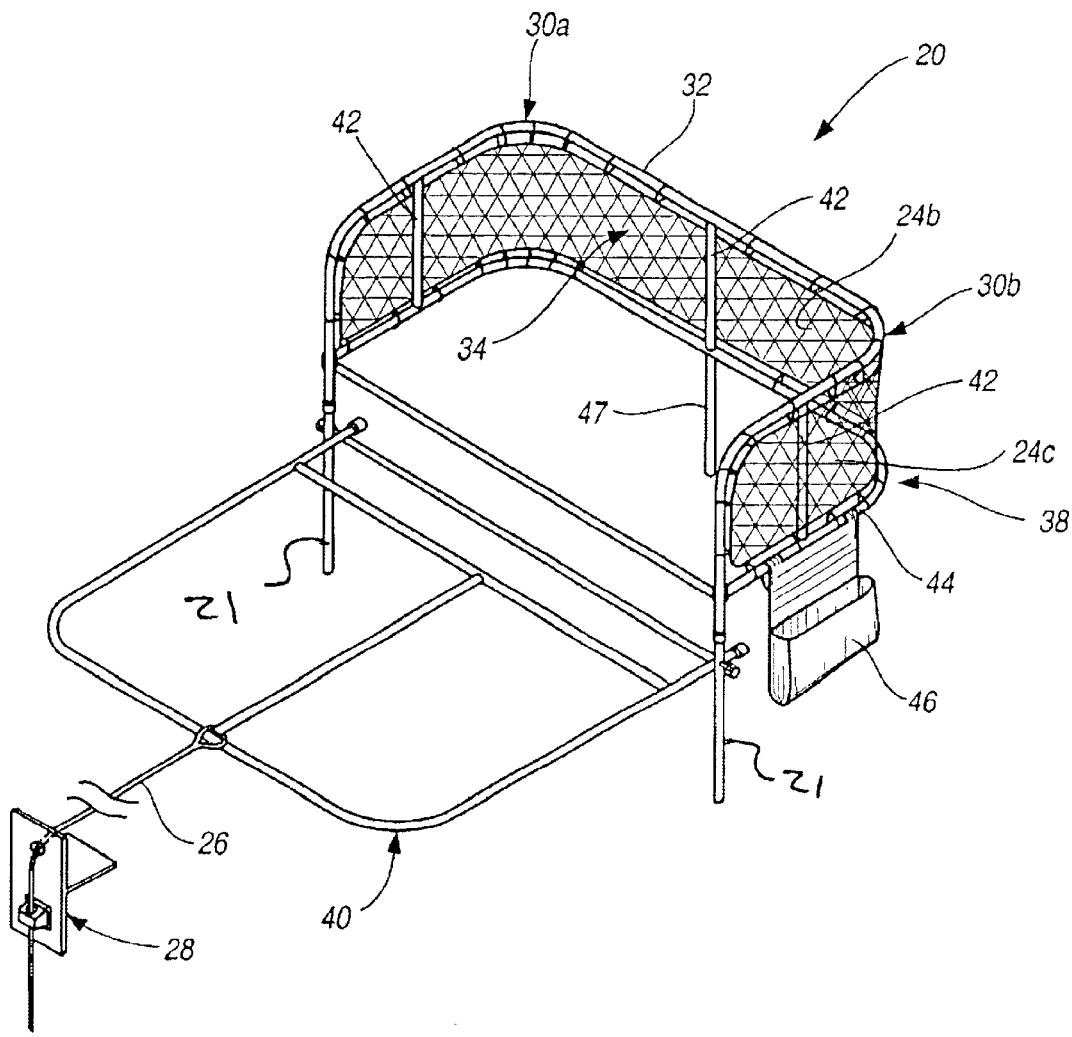
FIG. 6 is a perspective view of one embodiment of the present invention illustrating side compartment bags attachable to the co-sleeper, and optional leg to render support for the co-sleeper apparatus, the provision of telescoping side rails, as well as telescoping height adjusters, the supporting elements of the co-sleeper.

Referring now to FIG. 6, a further aspect of the present invention is directed to the provision of various pockets 46 on or about the co-sleeper apparatus 20 to facilitate the holding of desired items, such as lotions, diapers, powders, baby wipes, food items, liquids, etc. that one may wish to have in close proximity to a baby and/or pet. Preferably, pockets 46 are provided around the outside of the sidewalls 24a,b,c of the co-sleeping apparatus 20, although they can be provided in the interior as well as the exterior of the co-sleeping apparatus 20. Moreover, such pockets 46 may even descend beneath the mattress platform 44, either around the outside thereof or more centrally located beneath the mattress 22 itself. In such a manner, larger pockets can be used for a hamper for baby's clothes (whether clean or soiled) and separate pockets can be utilized for the storage of diapers (whether clean or soiled). In particular, a plastic lined hamper may be provided, connected either to the sidewall 24a,b,c or beneath the mattress 22 which can hold soiled diapers and which can be reversibly opened and closed so as to reduce the unpleasant smells of soiled diapers. In a preferred embodiment, one or more of the pockets 46 or hampers described above can be reversibly attached to the co-sleeping apparatus 20, such as through the use of hook/loop structures (Velcro™); snaps; buttons; and other suitable attachment means that will occur to those of skill in the art.

Figure 7:
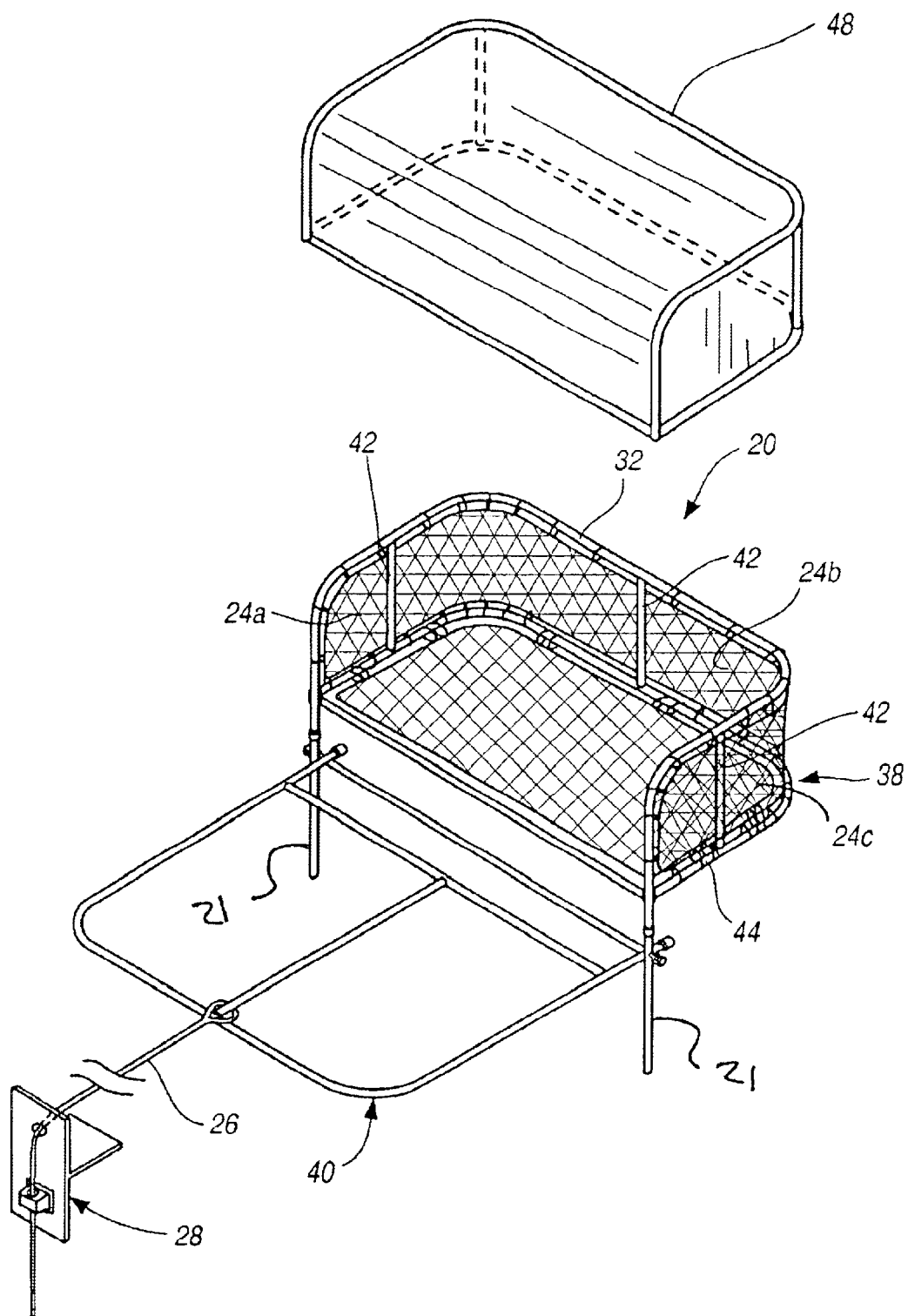
FIG. 7 is a perspective view of yet another embodiment of the present invention illustrating a flexible netting operatively associated with the base of the co-sleeper apparatus, as well as a separate cover to enclose the top and sides of the co-sleeper apparatus.

Referring still to FIG. 6, other features of the present invention that are not present in the prior art include the adjustability of the height of the sides of the co-sleeper. This can be accomplished, for example, by having telescoping rail support members 42 so that the height of sidewalls 24a,b,c can be adjusted by maneuvering at least two separate members vertically and locking/fixing them in place (e.g., using spring loaded lock pins, etc.). In addition, a floor support 47 may be used to add additional support for a large pet or weighted pocket or hamper Referring now to FIG. 7, a further aspect of the present invention relates to a cover 48 for the co-sleeper apparatus 20. A suitable cover 48 can merely consist of a hard and/or soft material covering the top supporting rail 32 of the co-sleeper apparatus 20 so as to preclude undesired amounts of light from entering into the co-sleeper apparatus 20 (e.g., creating a darkened environment in which infants can sleep or nap during daytime hours). In one embodiment, such a cover 48 is provided in a wound-up state, thus providing the ability of a parent to simply grasp one end of the cover 48 and extend the cover by pulling against a rotatable spring mechanism, thus allowing a desired amount of material to be unwound and affixed to the opposite side of the co-sleeper apparatus, thus achieving the closed top end of the co-sleeper apparatus 20. Removal of the cover 48 from one end of the co-sleeper apparatus (e.g., by disassociating Velcro™ material attachments, snaps, buttons, etc.) would then permit the rewinding of the material about a rotating spool at the opposite end of the co-sleeping apparatus. As one of skill will appreciate, there are various other means for reversibly extending a cover 48 over the top of the co-sleeping apparatus which can be provided, all of which falls within the scope of the present invention.

Figure 8:
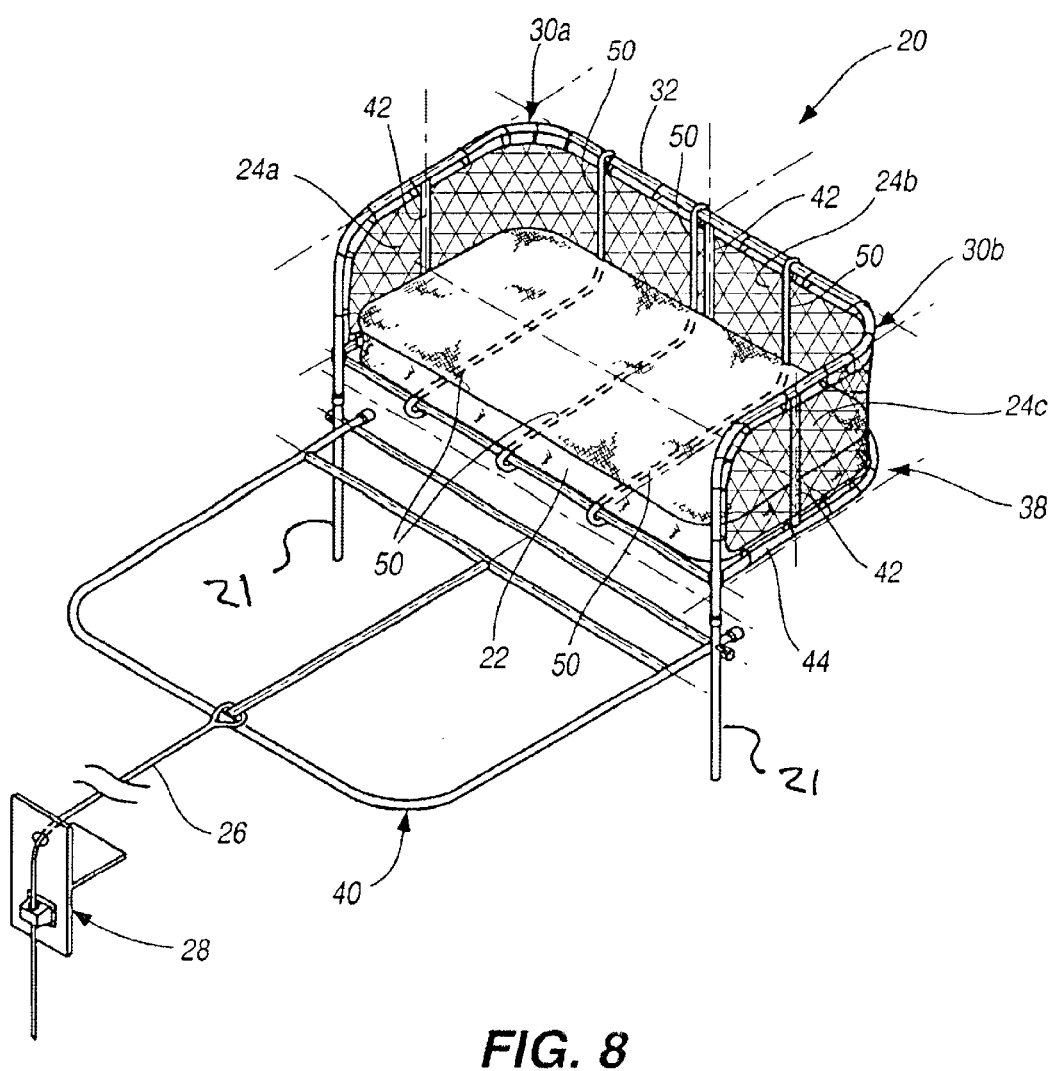
FIG. 8 is a perspective view of yet another embodiment of the present invention illustrating elastomeric strap materials underlying the base of the co-sleeper apparatus, together with optional heating pads, speakers or vibratory devices for mounting in association with the co-sleeper apparatus.

Referring now to FIG. 8, still other embodiments of the present invention allow for the mattress pad 22 to be movable with respect to the upper support rail 32, as, for example, by attaching the mattress pad 22 to the upper support rail 32 with an elastomeric material, thus providing for the "bouncing" of a baby or pet residing in the co-sleeper 20. As is well known, a bouncing and/or rocking movement of an infant often calms and/or soothes the infant/pet and may promote sleep thereof. Thus, in one embodiment of the present invention, one or more elastomeric members 50 are connected between the upper support rail 32 and the mattress platform 44 to provide for such bouncing movement. The elastomeric members 50 can be of any suitable type, including a rubber/plastic bungee cord-type configuration, springs, etc. Further embodiments of the present invention, include various sophisticated infant calming devices in conjunction with the present co-sleeper 20. For example, any suitable type of heating element (e.g., sleeping pad) can be used in association with the co-sleeper to provide desired additional heat to the sleeper, thus mimicking a mother's warm body heat. Similarly, the co-sleeper 20 of the present invention can be fitted with a sound emitting device which can comprise tape/CD recordings of soothing sounds, music, mother's heartbeat, mother's voice, etc. Such sound emitting devices can be connected to or made integral with the co-sleeper apparatus 20, for example, by attachment to the mattress platform 44, attachment to the overlying support rail 32, affixed to the side wall 24a,b,c, etc. Mechanical mechanisms can also be used with the co-sleeper apparatus 20 to create a swinging, rocking, vibrating or bouncing motion of the mattress pad in relation to the overlying support rail. As can be appreciated, a more sophisticated co-sleeper apparatus 20 for infants may include the ability to not only angulate the mattress pad 22 for the infant's comfort, but also a combination of bouncing, rocking, provision of heat and sound, etc. all intended to soothe or calm an upset infant and to make both the infant and the parental co-sleeping experience enjoyable. In addition, a stationary, movable, rotatable, bendable or otherwise adjustable light may be attached or manufactured as part of the co-sleeper apparatus 20. Such a light would aid the parent attending to the pet or infant, and also serve as a night-light for safety if set on a dim setting.

Figure 9:
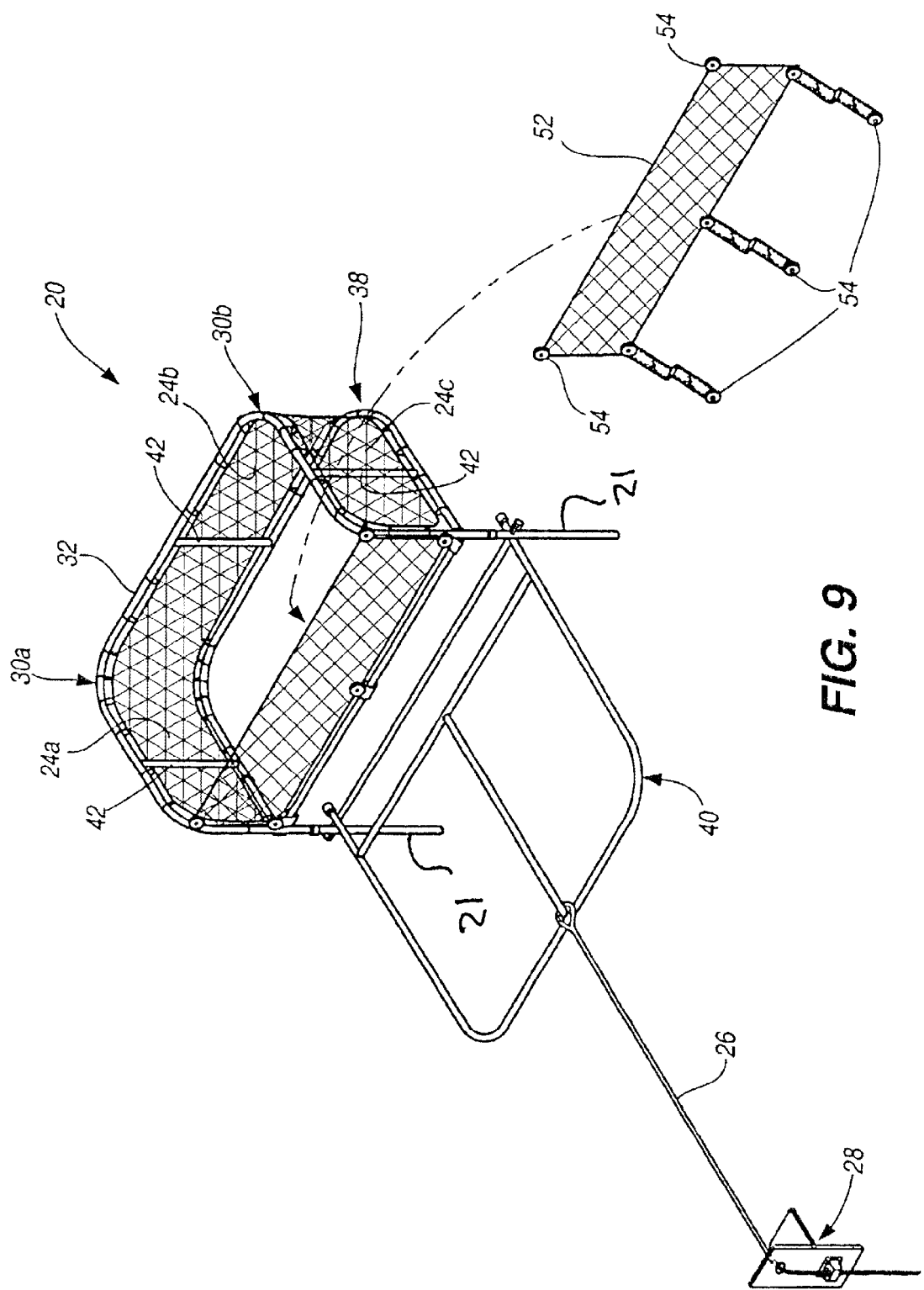
FIG. 9 illustrates a still further embodiment of the present invention wherein a partition is associated with the co-sleeper apparatus by means of a connection mechanism such as straps, velcro, etc.

Referring now to FIG. 9, another feature of the present invention relates to a fold-down and/or removable panel 52 which extends across the otherwise open side of the co-sleeping device 20. This "panel" 52 can be a curtain, an extendable accordion-like structure, an elastomeric member, a fold down partition, etc., and is intended to segregate the area within which the baby and/or pet sleeps from the parental bed itself. An attachment means 54 on one or both sides of the panel 52 are provided such that the panel 52 can be adjusted to permit access to the infant or pet in an easy fashion, especially given the fact that access to an infant in dark, night time conditions is anticipated. The attachment means 54 is therefore preferably of a simple and tactile design permitting an adult to detach or disengage the panel 52 from a closed position without great difficulty (e.g., hoop/loop Velco™ structures; clips; snaps; buttons, etc.).

Figure 10:
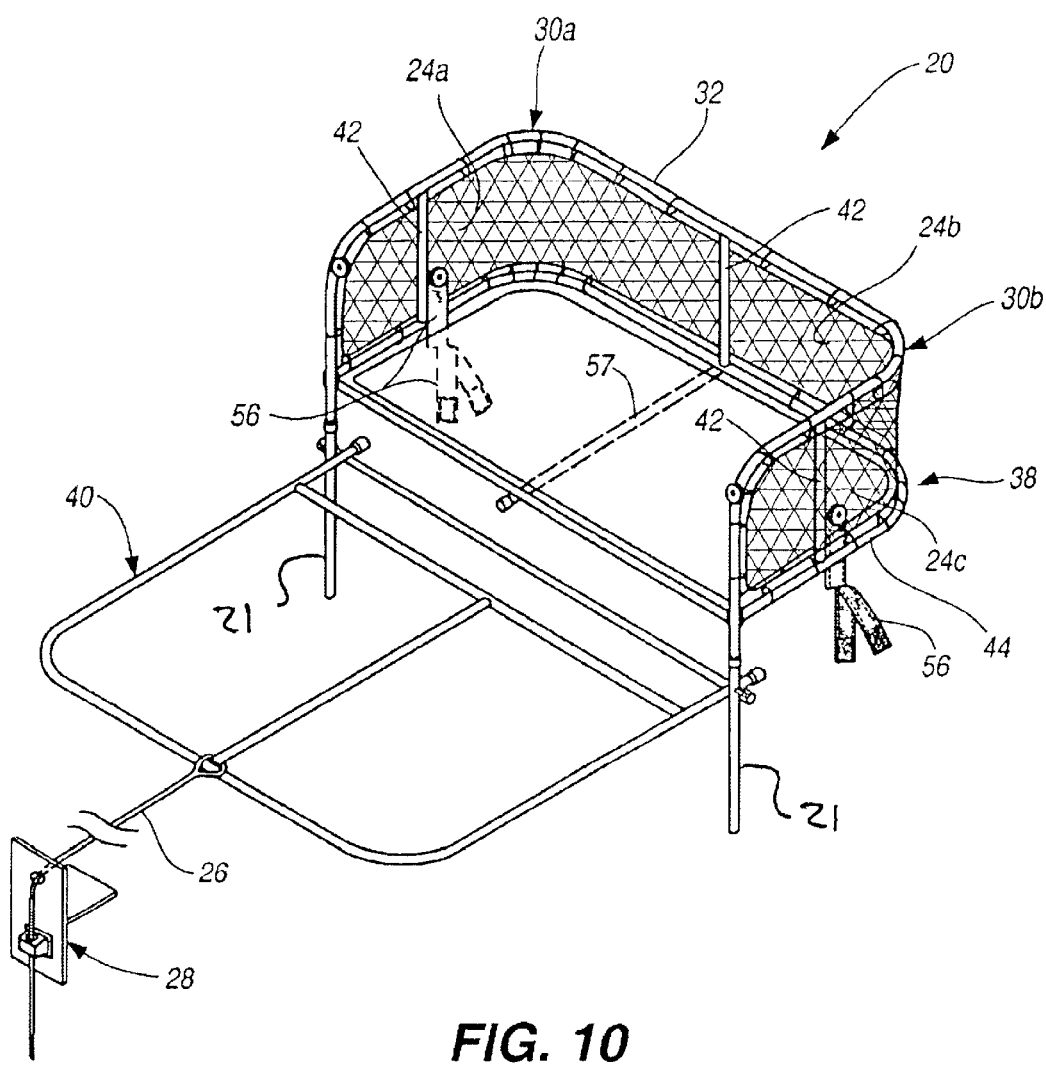
FIG. 10 illustrates a perspective view of the present invention with an adjustable bed angle device so that the angular orientation of the infant or pet lying within the co-sleeper device can be adjusted from both a lateral and/or a longitudinal perspective.

Referring now to FIG. 10, yet a further aspect of the present invention relates to the variable height angulation of the co-sleeper mattress 22 position. This feature provides the ability of a parent to angle the mattress 22 height so that an infant's head can be raised above the height of the infant's feet, thus providing some relief to infants having ear infections, nasal congestion, etc., wherein an elevated head position may be beneficial. Various means can be used to create the desired angulation of the mattress 22, including the adjustment of one side of the co-sleeper apparatus 20 by use of straps 56 which can be snapped, attached with Velcro™, etc., into a desired position (e.g., shortened or lengthened to affect desired angles). This particular method of modifying the angulation of the mattress pad 22 works particularly well in the "hanging" embodiments of the present invention whereby the mattress pad 22 simply descends from the upper support rail 32 by means of a curtain of material descending therefrom. In other embodiments, however, (e.g., telescoping members 42 acting as vertical support rails between the top horizontally extending support rail 32 and the mattress support 44) vertical supports 42 on one end of the co-sleeper 20 can be reduced in height, while other support rails 42 on the opposite side of the co-sleeper apparatus 20 can be extended, thus achieving a desired angulation of the mattress 22 itself. A lateral support 57 may also be provided, wherein it too is adjustable.

Figure 11:
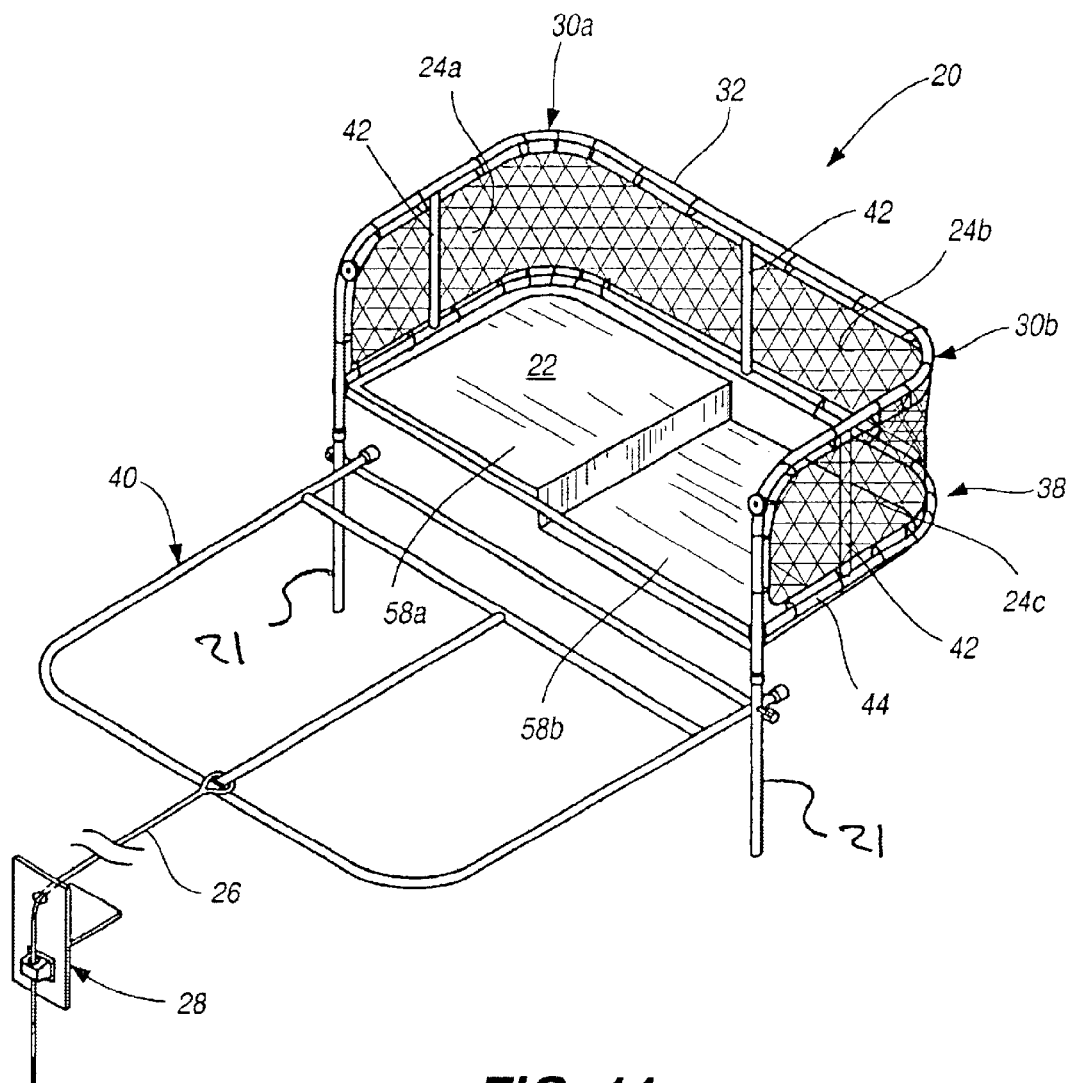
FIG. 11 illustrates a still further embodiment of the present invention illustrating the different levels possible within the co-sleeper apparatus itself to accommodate, for example, different pets, separating pets from pet supplies, etc.

Referring now to FIG. 11, in embodiments primarily intended for a pet, the present co-sleeper 20 can be provided with separate compartments 58a,b for the storage of dog food, water, etc. Indeed, in some embodiments, the co-sleeper 20 can have one or more bowls associated therewith which can hold food and/or water for a pet, thus providing the ability of a pet to not only sleep in the co-sleeper 20 next to a pet owner, but to also have access to food and water within the confines of the co-sleeper 20. Such compartments 58a,b may be preferably positioned at different levels/planes as compared to the sleeping surface. In one particular embodiment, the co-sleeper 20 for a cat is constructed so that a portion of the mattress area 22 is accommodated with a kitty litter area, such that a cat cannot only sleep in one portion of the co-sleeper apparatus 20, but can also urinate, etc. within the confines of the co-sleeper apparatus 20. Various containment means for a kitty litter box inside the co-sleeper apparatus 20 can be fashioned, all of which are within the scope of the present invention.

Height adjustment may also apply to a co-sleeper 20 for an infant. Accordingly, yet a further unique feature of the present invention relates to the adjustable position of the height of the co-sleeper mattress 22 in relationship to the parental bed B. In some embodiments, it may be preferred to have both of the mattresses M and 22 co-linear with each other so that there is essentially no difference in height between the top of the parental bed B and the top of the co-sleeper bed/mattresses 22. In other embodiments, however, it may be desired to have the co-sleeper mattress 22 slightly below and/or several inches below the parental bed mattress M, thus further ensuring that an infant and/or pet is precluded (e.g., by contact with the extending height portion of a parental bed) from accidentally rolling into the parental mattress area M. Alternatively, the top surface of the co-sleeper mattress 22 can extend slightly above, and up to several inches above, the parental bed mattress M, thus affording protection of an infant or pet inside the co-sleeper 20 from accidental contact with an adult sleeping in the parental bed B who may innocently roll towards the co-sleeper 20. In such event, with the heightened co-sleeper mattress 22 level, an adult would encounter the heightened mattress 22 of the co-sleeper 20 and not be able to roll into or on to the co-sleeper 20.

As one of skill in the art will appreciate by reviewing the figures and by reviewing the Detailed Description of the Present Invention, various structural aspects of the prior art can be used in conjunction with the novel features of the present invention. As such, the following U.S. patents are incorporated herein in their entireties by this reference: U.S. Pat. No. 6,112,347 to Tharalson et al., U.S. Pat. No. 5,293,655 to Van Winkle et al., U.S. Pat. No. 5,148,561 to Tharalson et al. and U.S. Pat. No. 5,819,340 to Kelly. For example, the mechanisms used to secure the co-sleeper to the parental bed as pictured in U.S. Pat. No. 6,112,347 can be utilized with the present invention. Similarly, the structures utilized in U.S. Pat. No. 5,148,561 to stabilize the support of a co-sleeper with the parental bed can also be utilized in conjunction with the present invention (e.g., use of relatively rigid and flat horizontal supports connected to the co-sleeper mattress support base and that extend between the box spring and mattress of the parental bed).

In view of the various embodiments discussed above, it will be apparent to one of skill in the art that several of the above structural and functional features of the present invention can be combined in various ways, without the necessity of all of such features being present in one particular device. As such, the present invention may incorporate one or more of the features as set forth in prior art designs (e.g., the use of rigid sidewalls, ground-contacting legs, etc.) while at the same time incorporating various other novel features (e.g., incorporation of rocking, heat emitting, sound emitting devices; provision of food/water/kitty litter containers within the confines of a co-sleeper; position of diaper hampers descending from a mattress support; retractable covers; etc.) without departing from the scope of the present invention.

While various embodiments of the present invention have been described in detail, it will be apparent that further modifications and adaptations of the invention will occur to those skilled in the art. It is to be expressly understood that such modifications and adaptations are within the spirit and scope of the present invention.

What is claimed is:

1. A co-sleeping apparatus, comprising:
    at least one rigid member including a contact portion for contacting a side of a parental bed, said rigid member spaced apart from a supporting floor;
    a parental bed attachment portion that fits between a parental mattress and a parental box spring, said parental bed attachment portion associated with said rigid member such that said rigid member can be held in a substantially fixed orientation with respect to the parental bed;
    a support railing operatively associated with said rigid member for supporting said support railing, said support railing defining the uppermost portion of said co-sleeper apparatus;
    a mattress platform positioned beneath said support railing and connected thereto;
    wherein said co-sleeping apparatus is devoid of any floor contacting support structure; and
    wherein a distance between said support railing and said mattress platform is telescopically variable, thereby facilitating adjustments in the height of the said support railing above the floor.

2. The co-sleeper as set forth in claim 1, wherein said mattress platform is suspended beneath said support railing and is attached to said support railing by flexible material.

3. The co-sleeper as set forth in claim 1, wherein said mattress platform provides support for a mattress pad, wherein said mattress pad is movable relative to said support railing so that said mattress pad can be angularly oriented with respect to the floor.

4. The co-sleeper as set forth in claim 1, wherein a see-through or partially see-through material connects said support railing to said mattress platform.

5. The co-sleeper as set forth in claim 1, further comprising a movable partition that separates an area circumscribed by said support railing and a parental bed.

6. The co-sleeper as set forth in claim 1, wherein a distance between said mattress platform and said support railing is reversibly adjustable.

7. The co-sleeper as set forth in claim 1, wherein said parental bed attachment portion, said rigid member and said support railing are collapsibly associated with one another such that said co-sleeper can assume a collapsed, flat configuration to facilitate transport thereof.

8. The co-sleeper as set forth in claim 1, wherein said mattress platform further comprises a portion for the containment of a material selected from the group consisting of pet food, water, kitty litter.

9. The co-sleeper as set forth in claim 1, further comprising at least one pocket formed on a sidewall of said co-sleeper, said sidewall formed from material connecting said mattress platform and said support railing.

10. The co-sleeper as set forth in claim 1, further comprising a storage compartment positioned beneath said mattress platform.

11. The co-sleeper as set forth in claim 1, wherein said storage compartment includes a plastic-lined reversibly sealable enclosure for holding soiled diapers.

12. The co-sleeper as set forth in claim 1, further comprising a cover extending on top of said support railing.

13. The co-sleeper as set forth in claim 1, wherein said cover is reversibly retractable.

14. A co-sleeping apparatus, comprising:
    a parental bed attachment for attaching said co-sleeping apparatus to a parental bed, wherein a portion of said parental bed attachment fits between a mattress and a box spring of the parental bed;
    a support railing defining the uppermost portion of a co-sleeper apparatus;
    a mattress platform suspended beneath said support railing and attached to said support railing by flexible material;
    wherein said co-sleeping apparatus includes at most one leg for providing support of said co-sleeping apparatus; and
    wherein a distance between said support railing and said mattress platform is telescopically variable, thereby facilitating adjustments in the height of the said support railing above the floor.

15. A co-sleeping apparatus, comprising:
    at least one rigid member that contacts a side of a parental bed, said rigid member having a first end and a second bottom end, said second bottom end not extending to the ground;
    a parental bed attachment portion that fits between a parental mattress and a parental box spring, said parental bed attachment associated with said rigid member such that said rigid member can be held in a substantially fixed orientation with respect to the parental bed;
    a support railing operatively associated with said first end of said rigid member, said support railing defining the uppermost portion of said co-sleeper;
    a mattress platform positioned beneath said support railing and operatively associated therewith, said mattress platform supported by a support structure consisting essentially of a single ground contacting leg; and wherein a distance between said support railing and said mattress platform is telescopically variable, thereby facilitating adjustments in the height of the said support railing above the floor.

16. A co-sleeping apparatus, comprising:

at least one rigid member including a contact portion for contacting a side of a parental bed, said rigid member spaced apart from a floor;

a parental bed attachment portion that fits between a parental mattress and a parental box spring, said parental bed attachment portion associated with said rigid member such that said rigid member can be held in a substantially fixed orientation with respect to the parental bed;

a support railing operatively associated with said rigid member for supporting said support railing, said support railing providing a boundary for an enclosure of said co-sleeper; and a mattress platform positioned within said enclosure, said mattress platform supported by a support structure including at most one leg for providing support of said co-sleeping apparatus different from said parental bed; and wherein a distance between said support railing and said mattress platform is telescopically variable, thereby facilitating adjustments in the height of the said support railing above the floor.

* * * * *